US011140102B1

(12) United States Patent
Bax et al.

(10) Patent No.: US 11,140,102 B1
(45) Date of Patent: Oct. 5, 2021

(54) SYSTEMS AND METHODS FOR INITIATING COMMUNICATION BETWEEN USERS BASED ON MACHINE LEARNING TECHNIQUES

(71) Applicant: Oath Inc., Dulles, VA (US)

(72) Inventors: Eric Bax, Sierra Madre, CA (US); Kimberly Williams, Burbank, CA (US); John Donald, Los Angeles, CA (US); Lisa Giaffo, Pasadena, CA (US); Tanisha Sharma, Los Angeles, CA (US); Nikki Thompson, Gardena, CA (US); Melissa Gerber, Los Angeles, CA (US)

(73) Assignee: Verizon Media Inc., New York, NY (US)

( * ) Notice: Subject to any disclaimer, the term of this patent is extended or adjusted under 35 U.S.C. 154(b) by 0 days.

(21) Appl. No.: 16/370,505

(22) Filed: Mar. 29, 2019

(51) Int. Cl.
| | |
|---|---|
| *G06N 20/00* | (2019.01) |
| *G06F 16/25* | (2019.01) |
| *G06F 8/20* | (2018.01) |
| *H04L 12/28* | (2006.01) |
| *H04L 15/16* | (2006.01) |
| *H04L 12/58* | (2006.01) |
| *H04L 29/08* | (2006.01) |

(52) U.S. Cl.
CPC .......... *H04L 51/043* (2013.01); *G06N 20/00* (2019.01); *H04L 51/12* (2013.01); *H04L 51/18* (2013.01); *H04L 51/32* (2013.01); *H04L 67/22* (2013.01)

(58) Field of Classification Search
CPC ....... H04L 51/043; H04L 51/32; H04L 51/18; H04L 67/22; H04L 51/12; G06N 20/00
USPC .......................................................... 709/206
See application file for complete search history.

(56) References Cited

U.S. PATENT DOCUMENTS

| | | | | |
|---|---|---|---|---|
| 7,710,885 | B2 * | 5/2010 | Ilnicki ..................... | H04L 45/42 370/241 |
| 7,890,581 | B2 * | 2/2011 | Rao ......................... | H04L 67/16 709/204 |
| 9,813,495 | B1 * | 11/2017 | Van Rensburg ....... | G06Q 30/02 |
| 10,042,939 | B2 * | 8/2018 | Sinha ................... | G06F 16/9535 |
| 10,331,856 | B1 * | 6/2019 | Schopke ................ | G16H 10/60 |
| 10,652,286 | B1 * | 5/2020 | George ................. | H04L 67/143 |
| 2003/0177886 | A1 * | 9/2003 | Koseki ................. | G10H 1/0008 84/600 |
| 2005/0037706 | A1 * | 2/2005 | Settle .................. | H04B 7/18526 455/12.1 |

(Continued)

*Primary Examiner* — David R Lazaro
*Assistant Examiner* — Berhanu Shitayewoldetadik
(74) *Attorney, Agent, or Firm* — Bookoff McAndrews, PLLC

(57) ABSTRACT

Systems and methods for initiating communication between users of a user group based on machine learning techniques. The disclosed systems and methods provide a novel framework for automating communication scheduling and communication initiation based on user communication objectives and machine learning techniques. The disclosed framework operates by leveraging available user provided communication parameters, user provided objectives, and various real-time data associated with the users, and using the aforementioned data as inputs for machine learning models, in order to schedule communication between the users, automatically initiate communication between the users, or transmit communication notifications to the users.

20 Claims, 11 Drawing Sheets

(56) References Cited

U.S. PATENT DOCUMENTS

| | | | |
|---|---|---|---|
| 2009/0077244 A1* | 3/2009 | Trang | H04M 3/42195 709/228 |
| 2010/0011069 A1* | 1/2010 | Haruna | H04L 65/1083 709/206 |
| 2012/0077536 A1* | 3/2012 | Goel | H04L 65/4061 455/518 |
| 2013/0039483 A1* | 2/2013 | Wolfeld | H04M 3/51 379/265.03 |
| 2013/0046770 A1* | 2/2013 | Tseng | G06F 16/9535 707/748 |
| 2013/0195026 A1* | 8/2013 | Johnsson | H04B 1/69 370/329 |
| 2013/0273855 A1* | 10/2013 | Cherian | H04W 4/02 455/68 |
| 2014/0032682 A1* | 1/2014 | Prado | H04L 51/14 709/206 |
| 2014/0172504 A1* | 6/2014 | Duva | G06Q 30/0242 705/7.31 |
| 2014/0199675 A1* | 7/2014 | Zajfman | G09B 5/00 434/350 |
| 2015/0088574 A1* | 3/2015 | Libin | H04L 67/42 705/7.19 |
| 2016/0036980 A1* | 2/2016 | Ristock | H04M 3/5166 379/265.12 |
| 2016/0078410 A1* | 3/2016 | Horton | G06Q 10/1095 705/7.19 |
| 2016/0092802 A1* | 3/2016 | Theebaprakasam | G06Q 10/0631 705/7.12 |
| 2016/0125507 A1* | 5/2016 | Bueno Lobl | G06Q 30/0613 705/26.41 |
| 2016/0239192 A1* | 8/2016 | Chiu | H04L 51/046 |
| 2017/0006258 A1* | 1/2017 | Farrell | H04L 67/303 |
| 2017/0042439 A1* | 2/2017 | Yeow | A61B 5/165 |
| 2017/0048323 A1* | 2/2017 | Schlapfer | G16H 40/20 |
| 2017/0142259 A1* | 5/2017 | Schmitz | H04L 65/403 |
| 2017/0236097 A1* | 8/2017 | Smith | G06Q 10/1095 705/7.19 |
| 2017/0351968 A1* | 12/2017 | Bowers | G06F 3/0608 |
| 2018/0165656 A1* | 6/2018 | Tessler | G06Q 10/1095 |
| 2018/0173692 A1* | 6/2018 | Greenberg | G06F 3/04842 |
| 2018/0204438 A1* | 7/2018 | Cullin | G08B 25/009 |
| 2018/0218238 A1* | 8/2018 | Viirre | G06N 3/02 |
| 2018/0323972 A1* | 11/2018 | Reed | G06F 3/017 |
| 2019/0065796 A1* | 2/2019 | Matsumoto | H04B 5/0056 |
| 2019/0073601 A1* | 3/2019 | Alkan | G06N 20/00 |
| 2019/0179861 A1* | 6/2019 | Goldenstein | G06F 16/9535 |
| 2019/0205810 A1* | 7/2019 | Pojar | H04L 67/306 |
| 2019/0279281 A1* | 9/2019 | Kumar | G06Q 30/0631 |
| 2019/0281030 A1* | 9/2019 | Isaacson | G06Q 30/0633 |
| 2019/0294999 A1* | 9/2019 | Guttmann | G06K 9/6219 |
| 2019/0334956 A1* | 10/2019 | Hodgins | G06N 20/00 |
| 2019/0356505 A1* | 11/2019 | Madden | H04L 12/2812 |
| 2019/0356506 A1* | 11/2019 | Beach | H04L 12/2812 |
| 2020/0028815 A1* | 1/2020 | He | H04L 12/1859 |
| 2020/0036783 A1* | 1/2020 | Bourassa | H04W 4/08 |
| 2020/0045259 A1* | 2/2020 | Bax | H04N 5/44504 |
| 2020/0160399 A1* | 5/2020 | Rakshit | G06K 9/00664 |
| 2020/0215442 A1* | 7/2020 | Leiba | A63G 31/00 |
| 2020/0279567 A1* | 9/2020 | Adlersberg | G06F 40/279 |

* cited by examiner

SYSTEMS AND METHODS FOR INITIATING COMMUNICATION BETWEEN USERS BASED ON MACHINE LEARNING TECHNIQUES

TECHNICAL FIELD

The present disclosure relates to techniques for recommending communication between users, based on user objectives and parameters, and further based on machine learning and mathematical probabilistic models.

BACKGROUND

People often struggle to determine suitable times to electronically communicate with each other. Unscheduled phone calls and/or chat sessions can sometimes be inconvenient and/or disruptive. Modern systems and techniques for scheduling a time for users to communicate with one another often requires at least one user to manually schedule an appointment or reminder. In some instances, automated communication bots may be used to initiate communication between one or more users, however, as with the aforementioned scheduling systems, at least one user must manually schedule the initial appointment automated communication bot. In both instances, scheduling the appointment in advance is time-consuming and further assumes that the scheduled time for the communication will remain an ideal time for the users to communicate.

SUMMARY OF THE DISCLOSURE

Embodiments of the present disclosure include systems and methods for recommending and initiating communication between users based on machine learning techniques.

According to certain embodiments, computer-implemented methods are disclosed for initiating electronic communication between members in a user group. One method may include receiving, at at least one server, input data comprising communication parameters and communication objectives of a first member of a communication scheme; receiving, at the at least one server, the input data comprising communication parameters and communication objectives of a second member of the communication scheme; receiving, at the at least one server, objective measurements of electronic communications between the first member and the second member; updating or training a machine learning model based on communication between the first member and the second member and (i) the received communication parameters and communication objectives of the first member; (ii) the received communication parameters and communication objectives of the second member; and (iii) the objective measurements of electronic communications between the first member and the second member; receiving, at the at least one server, real-time data corresponding to the first member and/or the second member from at least one external data source; determining a score for communications availability between the first member and the second member by comparing the received real-time data to the updated or trained model of communication between the first member and the second member; and generating and transmitting an electronic notification to one or both of the first member and the second member if the determined score exceeds a threshold for favorable communications.

According to certain embodiments, systems are disclosed for initiating electronic communication between members in a user group comprising. One system may include a processor configured to execute the instructions to perform a method including: receiving, at at least one server, input data comprising communication parameters and communication objectives of a first member of a communication scheme; receiving, at the at least one server, the input data comprising communication parameters and communication objectives of a second member of the communication scheme; receiving, at the at least one server, objective measurements of electronic communications between the first member and the second member; updating or training a machine learning model based on communication between the first member and the second member and (i) the received communication parameters and communication objectives of the first member; (ii) the received communication parameters and communication objectives of the second member; and (iii) the objective measurements of electronic communications between the first member and the second member; receiving, at the at least one server, real-time data corresponding to the first member and/or the second member from at least one external data source; determining a score for communications availability between the first member and the second member by comparing the received real-time data to the updated or trained model of communication between the first member and the second member; and generating and transmitting an electronic notification to one or both of the first member and the second member if the determined score exceeds a threshold for favorable communications.

According to certain embodiments, non-transitory computer readable medium are disclosed for initiating electronic communication between members in a user group comprising. One non-transitory computer readable medium may include a processor configured to execute the instructions from a storage device to perform a method including receiving, at at least one server, input data comprising communication parameters and communication objectives of a first member of a communication scheme; receiving, at the at least one server, the input data comprising communication parameters and communication objectives of a second member of the communication scheme; receiving, at the at least one server, objective measurements of electronic communications between the first member and the second member; updating or training a machine learning model based on communication between the first member and the second member and (i) the received communication parameters and communication objectives of the first member; (ii) the received communication parameters and communication objectives of the second member; and (iii) the objective measurements of electronic communications between the first member and the second member; receiving, at the at least one server, real-time data corresponding to the first member and/or the second member from at least one external data source; determining a score for communications availability between the first member and the second member by comparing the received real-time data to the updated or trained model of communication between the first member and the second member; and generating and transmitting an electronic notification to one or both of the first member and the second member if the determined score exceeds a threshold for favorable communications.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
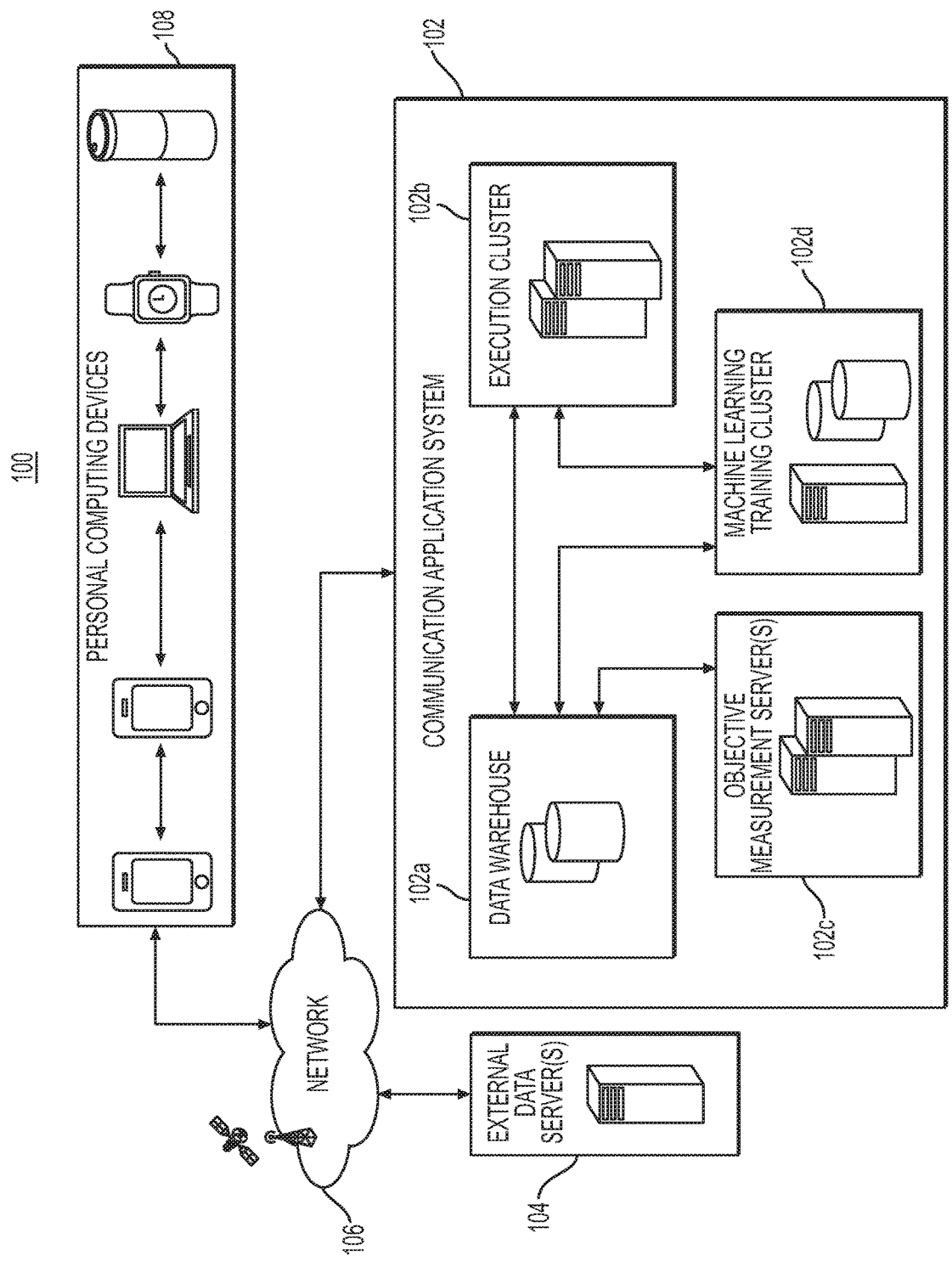
FIG. 1A is a schematic diagram illustrating an example of a network within which the systems and methods disclosed herein could be implemented according to some embodiments of the present disclosure.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of systems and methods for initiating communication between users based on machine learning techniques.

As described above, there is a need in the field of communication automation for recommending and/or automatically scheduling communication between one or more users based on user parameters, objectives, real-time data regarding the user, and/or machine learning techniques. Conventional communication scheduling techniques involve manually scheduling a time for users to communicate and does not take into consideration a user's interest in maintaining the scheduled meeting time after the communication meeting has been scheduled. Accordingly, the present disclosure is directed to techniques for recommending and/or automatically scheduling communication between two or more users, based on user communication parameters and objectives, external data known about the users, and/or machine learning data. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a personal computing device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof Likewise, sub-networks, which may employ differing architectures or may be compliant or compatible with differing protocols, may intemperate within a larger network.

For purposes of this disclosure, a "wireless network" should be understood to couple personal computing devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.llb/g/n, or the like. Network access technologies may enable wide area coverage for devices, such as personal computing devices with varying degrees of mobility, for example.

In short, a wireless network may include virtually any type of wireless communication mechanism by which signals may be communicated between devices, such as a personal computing device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a personal computing device may include a computing device capable of sending or receiving signals, such as via a wired or a wireless network. A personal computing device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A personal computing device may vary in terms of capabilities or features. Claimed subject matter is intended to cover a wide range of potential variations, such as a web-enabled personal computing device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display and components for displaying augmented reality objects, for example.

A personal computing device may include or may execute a variety of possible applications, such as a client software application enabling communication with other devices. A personal computing device may also include or execute an application to communicate content, such as, for example, textual content, multimedia content, or the like. A personal compuyting device may also include or execute an application to perform a variety of possible tasks, such as browsing, searching, playing, streaming or displaying various forms of content, including locally stored or uploaded images and/or video, or games (such as live video calls).

As discussed here, a user is an individual who uses the communication application system. A user group is a set one or more pairs of individuals that communicate with one another and may further have a shared governance structure, communication permissions, and communication parameters. A member is an individual who is opted in or otherwise added to a user group.

Users and user groups may establish communication parameters with the communication application system. For example, the user group may establish candidate members, data-gathering constraints, group governance (e.g. group administrators), group permissions directed to who and how users can opt in, how members are removed, and privacy settings. Users and user groups may also establish how they wish to be notified (e.g. text message, phone call, in-application message/call) of a scheduled communication or how they would like to notify other users of their desire to communicate.

As discussed further herein, a communication may be one or more of a phone call, video call, text message, email, instant messages, audio/video messages, social media: messages, posts, comments, or likes; that take place within communication applications, across telephony or gaming networks.

Users and user groups may also establish communication objectives. For example an objective may be having video calls, communication (e.g. phone call) satisfaction, communication duration, length of time between communications, tone of communication, communication from specific individuals (e.g. family, friends, or significant others), media consumption, or post-communication activity (e.g. exercise, shopping, or learning a new subject). Users or user groups may set objectives on behalf of other users and may further measure, weight or set objective settings. For example, a user may grade a communication, rate a communication on a scale (e.g. 1 to 10), indicate an emotion associated with a communication (e.g. select happy/sad face), and/or weight a communication indicating a user or user group preference.

In one embodiment, a user, via a communication application, may establish a user group comprising the user's family and/or friends by requesting that the family and/or friends opt in to the group, becoming members; or alternatively the family and/or friends may be automatically added to the user group as members. Once members have joined the group, communication parameters and objectives for the group or each individual member of the group may be established and received by a communication application system. Upon receipt of the communication parameters and/or objectives at the communication application system, a machine learning model may be updated or trained based on the received communication parameters and/or objectives. The communication application system may additionally receive real-time data corresponding to the user group and each individual member. Upon receipt of communication parameters and/or objectives and real-time data, a score for communication availability may be determined for each user, member, and/or group, by comparing the communication parameters and/or objectives and real-time data to the trained machine learning model data. If the communication availability score exceeds a certain threshold or members/users have matching scores, then an electronic notification may be generated and transmitted to the personal computing device of each member with a communication availability score exceeding the threshold or has a communication availability score that matches another member.

FIG. 1A depicts a schematic diagram illustrating an example of a communication network 100 within which the systems and methods disclosed herein could be implemented according to one or more embodiments of the present disclosure. A communication network 100 may include a communication application system 102, external data server(s) 104, a network 106, and personal computing devices 108. The communication application system 102 may be further comprised of a data warehouse 102a, execution cluster 102b, objective measurement server(s) 102c, and a machine learning training cluster 102d. The data warehouse 102a may be any type of database or memory, and may be configured to be directly in communication with the execution cluster 102b, objective measurement server(s) 102c, and or machine learning training cluster 102d.

Figure 2:
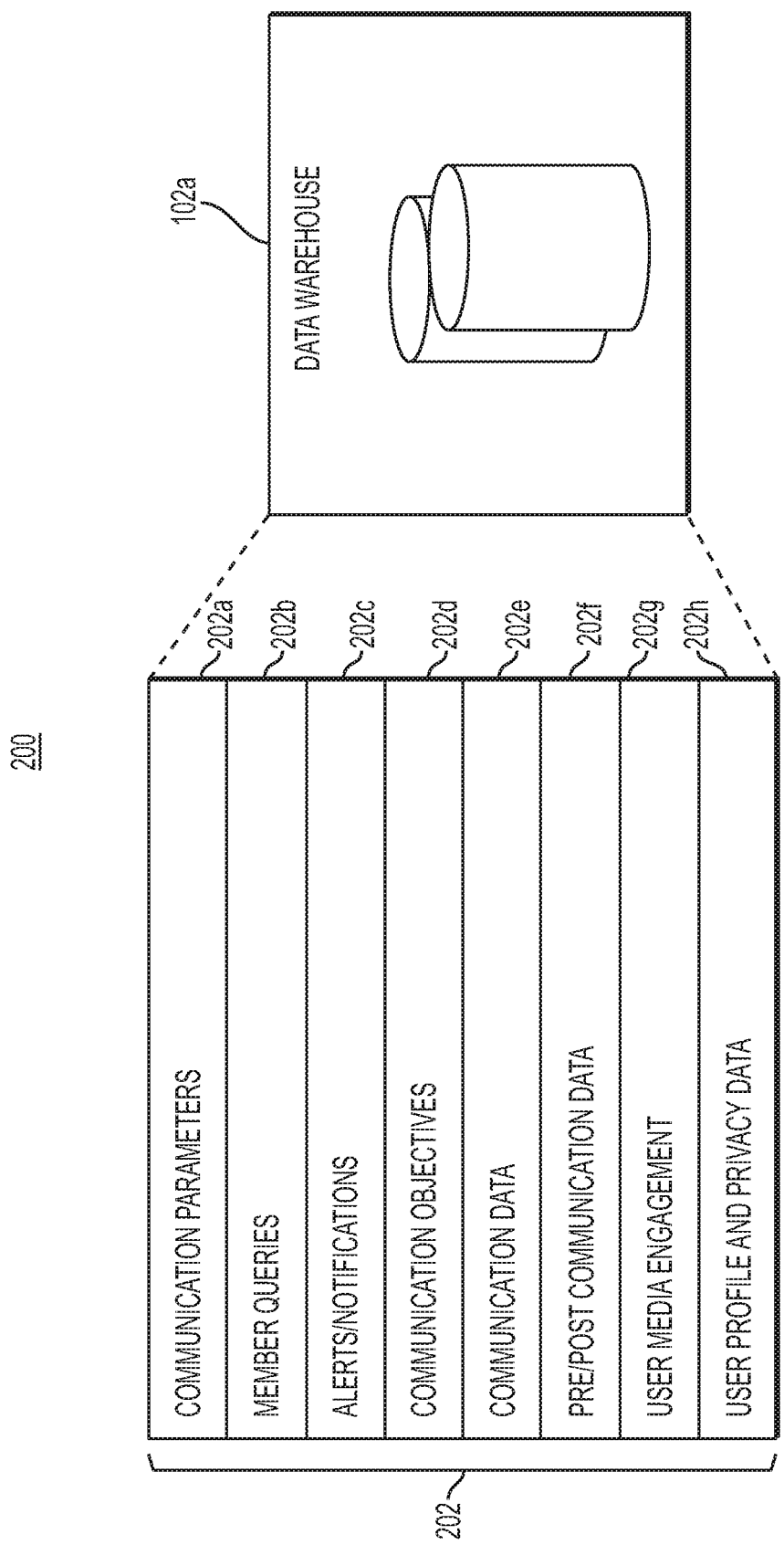
FIG. 2 is a block diagram illustrating the types of data that may be stored in a data warehouse.

The data warehouse 102a may house one or more databases storing dataset(s) of data and metadata associated with local and/or network information related to users, members, user groups, services, applications, content (e.g., video) and the like, as further discussed in FIG. 2. Such information may be stored and indexed in the data warehouse 102a independently and/or as a linked or associated dataset. As discussed above, it should be understood that the data (and metadata) in the data warehouse 102a can be any type of information and type, whether known or to be known, without departing from the scope of the present disclosure.

The execution cluster 102b may include a device that includes a configuration to provide any type or form of content via a network to another device. Devices that may operate as execution cluster 102b may include one or more of personal computers desktop computers, multiprocessor systems, microprocessor-based or programmable consumer electronics, network PCs, server(s), and the like. Execution cluster 102b can further provide a variety of services that include, but are not limited to, email services, alert/notification(s), instant messaging (IM) services, streaming and/or downloading media services, search services, photo services, web services, social networking services, news services, third-party services, audio services, video services, SMS services, MMS services, FTP services, telephony services, voice over IP (VOIP) services, gaming services, or the like. The execution cluster 102b may be configured to automatically provide one or more of the aforementioned services based on the data stored in the data warehouse 102a, external data server(s) 104, and or information received from the machine learning training cluster 102d or objective measurement server(s) 102c.

The objective measurement server(s) 102c may include one or more of personal computers desktop computers, multiprocessor systems, microprocessor-based or programmable consumer electronics, network PCs, server(s), and the like. The objective measurement server(s) 102c may be configured to perform calculations and measurements, and interpret data received from one or more personal computing devices 108, external data server(s) 104, or stored data on the data warehouse 102a. For example, upon data being received from one or more personal computing devices 108 corresponding to user(s)/member(s)/user group(s) and/or from external data server(s), the objective measurement server(s) 102c may be configured to calculate, measure, and make determinations pertaining to user(s)/member(s)/user group(s) objectives and parameters. The objective measurement server(s) may, for example, calculate, measure, and make determinations, for data including, but not limited to, user satisfaction with communication (e.g. data corresponding to defining emotion, confidence, learning, and helpfulness), duration of communication (e.g. data pertaining to the amount of time a phone call, text message exchange, or video call lasted), time between communications, tone of a communication (e.g. a user may specific that they would only like to receive happy calls; or alternatively the tone of a communication may gauged by receiving tone signals indicating pitch (high or low) voices, speed of speech, crying, gasping, rate of speech or text, interruptions, and if a video call, video signals representing mood and emotions, based on facial recognition), actions before or after communication (e.g. exercising, shopping, traveling, reading, contacting another user/member), media consumption (e.g. amount or lack thereof, of movies, pictures, music, social media, and games). The objective measurement server(s) may also make correlations between received data, and further make calculations, measurements, and determinations based on data received at a predetermined period of time, predetermined locations, predetermined user(s)/member(s)/user group(s), predetermined third parties, and/or demographics. The objective measurement server(s) 102c may further determine how the received data should be categorized in the data warehouse 102a.

The machine learning training cluster 102d may include one or more of personal computers, desktop computers, multiprocessor systems, microprocessor-based or programmable consumer electronics, database(s), network PCs, server(s), and the like. As will be explained in more detail in FIG. 4, the machine learning training cluster 102d generates machine learning models/algorithms and updates and refines training data based on data inputs corresponding to information received from personal computing devices 108, information stored in the data warehouse 102a, and external data server(s) 104. When new user(s)/member(s)/user group(s) are created or opted-in, the initial machine learning models/algorithms may be based on historical data associated with other users and/or other user groups with similar sets of users and communication objectives. Then, as the user(s)/member(s)/user group(s) use the communication application, the model/algorithm can be updated based on data specific to the user(s)/member(s)/user group(s). Additionally, data for updated machine learning models/algorithms may be received based on explore/exploit techniques, wherein communication may be initiated or recommended to user(s)/member(s)/user group(s) based on supported or unsupported models in order to discover and confirm accuracy or inaccuracy correlating to current models/algorithms and parameters.

The external data server(s) 104 include one or more of personal computers desktop computers, multiprocessor systems, microprocessor-based or programmable consumer electronics, database(s), network PCs, server(s), and the like, maintained by third parties storing business-to-business or business-to-consumer data (e.g. Verizon®, Apple®, Google®, Netflix®, Nordstrom®, Amazon®, a government entity, or the like). The communication application system 102, may receive data stored on the external data server(s) 104 on one or more of its computing devices. The data stored at the external data server(s) 104 may include, but is not limited to, information related to: weather, news, transportation (e.g. public and private data related to airplanes, rocket ships, trains, and aquatic vehicles), mobile devices (e.g. iPhone®), smart accessories (e.g. Apple Watch®), artificial intelligence enabled devices (e.g. Alexa®, Google home®, Facebook Portal®, and the like), and GPS data corresponding to a user or a personal computing device 108. For example, the communication application system 102 may receive or may be able to parse data from the external data server(s) 104 pertaining to specific user(s)/member(s)/user group(s) streaming interests on Netflix® (i.e. any content provider) and IP addresses associated with personal computing devices receiving the streaming data; information regarding user(s)/member(s)/user group(s) data collected by artificial intelligence personal assistants (e.g. ordering habits, user-to-user communication, reminders, user queries, and the like); personal computing device information (e.g. device signal strength, number and type of applications on the device, SIM/eSIM data, IMEI information, data stored in the cloud corresponding to the device, internet based user queries, and the like); and banking information (e.g. account balance, credit history, debt information, and the like).

In general, network 106, may include local area networks ("LANs")/wide area networks ("WANs") network, wireless network, or any combination thereof, and configured to implement protocols for transmitting data in communication network 100 according to the systems and methods discussed herein. Not all the components featured in FIG. 1 may be required to practice the disclosure, and variations in the arrangement and type of the components may be made without departing from the spirit or scope of the disclosure.

The personal computing devices 108 may include virtually any desktop or portable computing device capable of receiving and sending a message over a network, such as network 106, or the like. For example, a personal computing device 108 may be a mobile phone, a desktop computer, a laptop computer, a landline phone, a gamin system, a television, smart accessory, and/or a digital or artificial intelligence enabled personal assistant. Personal computing devices 108 may include virtually any portable computing device capable of connecting to another computing device and receiving information, as discussed above. Personal computing devices 108 may also include at least one client application (e.g. a communication application) that is configured to receive communication and/or content from another computing device. In some embodiments, mobile devices (e.g. a mobile phone) may also communicate with non-mobile personal computing services (e.g. an Amazon Alexa®), or the like. In one embodiment, such communications may include sending and/or receiving messages or voice/video calls, searching for, viewing and/or sharing photographs, digital images, audio clips, video clips, or any of a variety of other forms of communications. Personal computing devices 108 may be capable of sending or receiving signals, such as via a wired or wireless network, or may be capable of processing or storing signals, such as in memory as physical memory states, and may, therefore, operate as a server. Network 106 is configured to couple personal computing devices 108 and its components with components corresponding to the communication application system 102. Network 106 may include any of a variety of wireless sub-networks that may further overlay stand-alone ad-hoc networks, and the like, to provide an infrastructure-oriented connection for the personal computing devices 108.

Figure 1B:
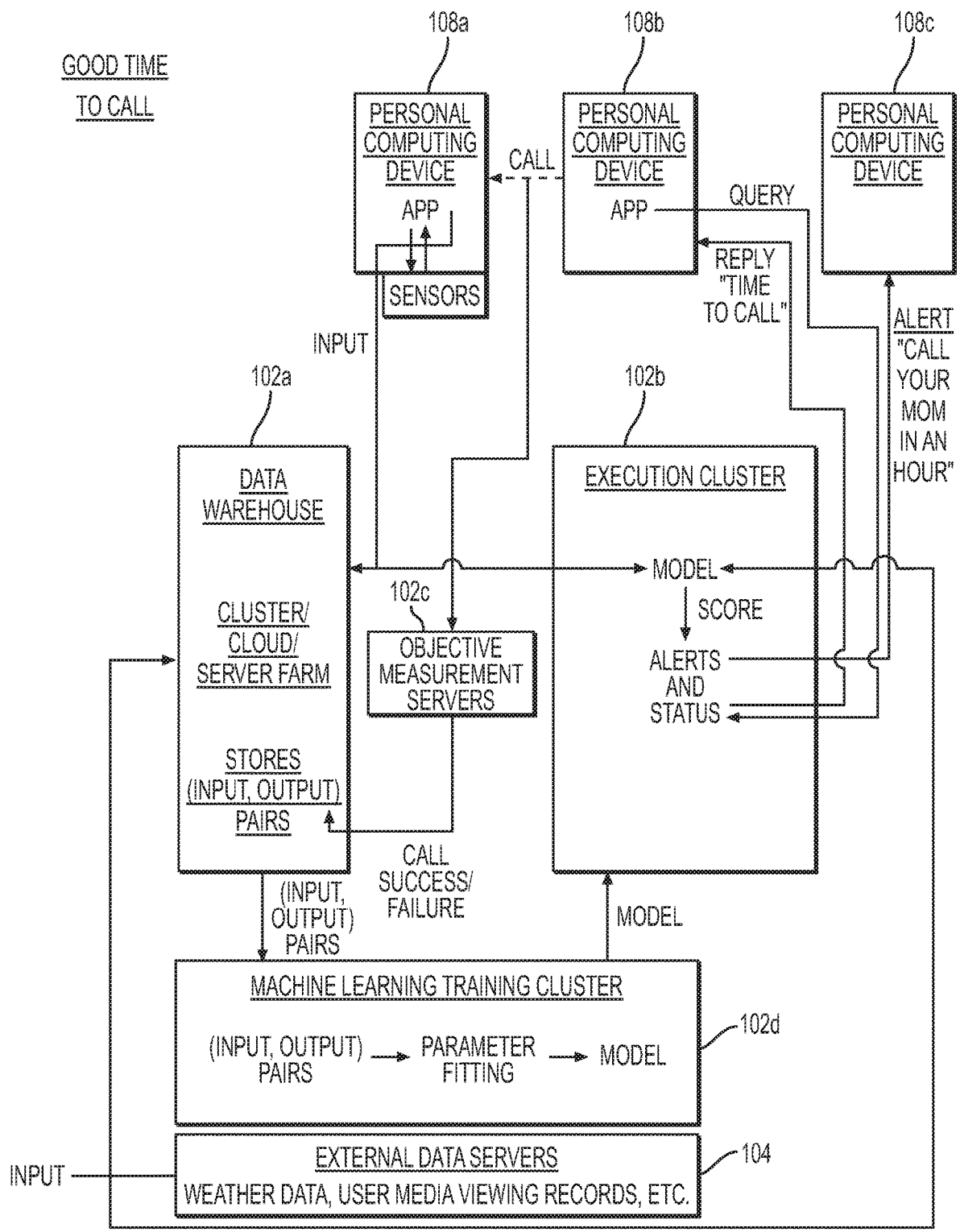
FIG. 1B is a flow diagram illustrating an exemplary data flow between devices on a network.

FIG. 1B is a flow diagram illustrating an exemplary data flow between devices on a network. Once members have joined the group, communication parameters and objectives for the group or each individual member may be established and received by a communication application system 102 and its sub-components, e.g.: data warehouse 102a, execution cluster 102b, objective measurement servers 102c, and machine learning training cluster 102d. Upon receipt of the communication parameters and/or objectives at the communication application system 102, a machine learning model formulated by the machine learning training cluster 102d is updated or trained based on the received communication parameters and/or objectives. The communication application system 102 may additionally receive real-time data corresponding to the user group and each individual member received directly from person computing devices 108a-c corresponding to the one or more user(s)/member(s)/user group(s), or from external data server(s) 104. The received communication parameters and/or objectives and real-time data may be analyzed by the objective measurement servers 102c to ensure that processes implemented by the communication application system align with the received user/member/user group communication parameters and/or objectives. A score for communication availability is determined for each user, member, and/or group, by comparing the communication parameters and/or objectives and real-time data to the trained machine learning model data implemented by the machine learning training cluster 102d. If the communication availability score exceeds a certain threshold or members/users have matching scores, then an electronic notification may be generated by the execution cluster 102b and transmitted to the personal computing device of each member with a communication availability score exceeding the threshold or has a communication availability score that matches another member. Generally the data warehouse 102a may store dataset(s) of data and metadata associated with local and/or network information related to users, members, user groups, services, applications, content (e.g., video) and the like, as will be explained in detail in FIG. 2. The data may be transmitted between the personal computing devices 108a-c, the communication application system 102 and its subcomponents (data warehouse 102a, execution cluster 102b, objective measurement server(s) 102c, and machine learning training cluster 102d), and the external data server(s) 104, through the network 106 discussed above, which may include local area networks ("LANs")/wide area networks ("WANs") network, wireless network, or any combination thereof.

FIG. 2 is a block diagram illustrating the types of data may be stored in data warehouse 102a. According to some embodiments, the data warehouse 102a may be configured to store data for users, e.g., user data, profile data, communication objectives, etc. In some embodiments, the user data can also include, for purposes of scheduling a communication (e.g. a phone call, text message, or video call), augmenting communication parameters 202a, user/member queries 202b, alerts/notification data 202c, communication objectives 202d, communication data 202e, pre/post communication data 202f, user media engagement data 202g, and user profile and privacy data 202h, user device information, including, but not limited to, device identifying information, device capability information, voice/data carrier information, Internet Protocol (IP) address, applications installed or capable of being installed or executed on such device, and/or any, or some combination thereof. According to some embodiments, the stored user data can also include, but is not limited to, information associated with a user's profile, user interests, user behavioral information, user attributes, user demographic information, user location information, user biographic information, and the like, or some combination thereof. According to some embodiments, data warehouse 102a may be configured to store data and metadata associated with user/member/user group communications from an assortment of telephony, internet, and media service providers and/or platforms. Such data can be derived from information provided by the user/member/user group, a service provider (i.e., Verizon®), by the content/service providers providing video content (e.g., Verizon®, ESPN®, ABC Sports®, Netflix®, Hulu®, YouTube®), or by other third party services (e.g., rottentomatoes.com, IMDB™, Facebook®, Twitter® and the like), or some combination thereof. It should be understood that the data (and metadata) stored in the data warehouse 102a may be any type of information related to a user/member/user group, content, a device, an application, a service provider, a content provider, whether known or to be known, without departing from the scope of the present disclosure.

Figure 3:
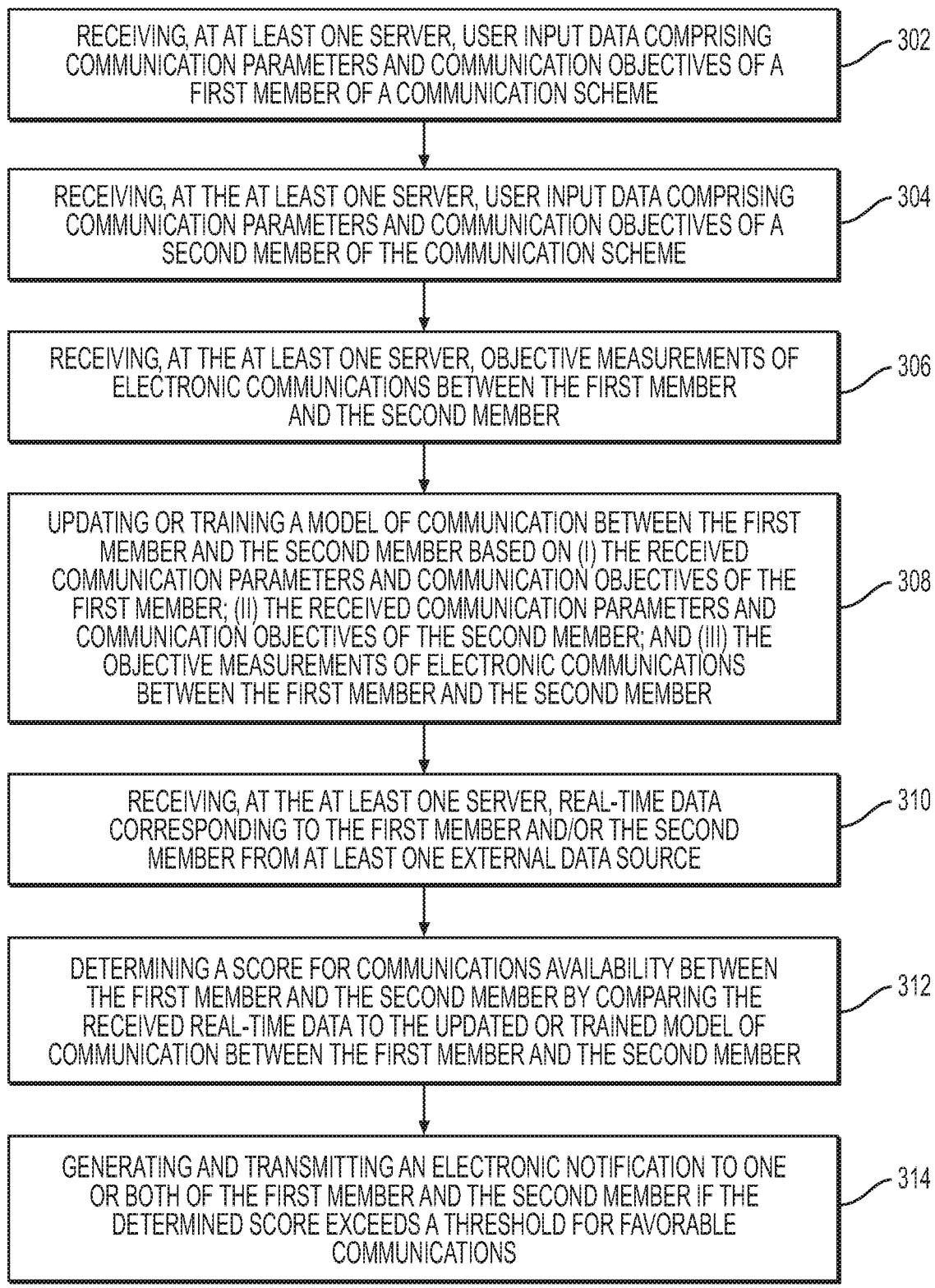
FIG. 3 is flow diagram illustrating steps performed in accordance with some embodiments of the present disclosure.

FIG. 3 is flow diagram illustrating steps performed in accordance with some embodiments of the present disclosure. In initially interacting the communication application as a user or opting into or establishing a user group, the communication application system 102 may receive, at at least one server, user input data comprising communication parameters and communication objectives of a first member of a communication scheme (Step 302). For example, the first member may indicate a desire to be alerted to favorable communication times with a friend or family member. Concurrently or at another point in time, the communication application system 102 may additionally receive, at the at least one server, user input data comprising communication parameters and communication objectives of a second member of the communication scheme (Step 304). For example, the second member may indicate a consent to be joined into a group with the first member, and/or may likewise initiate a desire to be alerted to favorable communication times with that same friend or family member. The communication application system 102 may receive, at the at least one server, objective measurements of electronic communications between the first member and the second member (Step 306). For example, the communication application system may monitor and log communication patterns, e.g., call times, call durations, etc. between the first and second users (e.g., first and second users tend to speak on the weekend, or tend to speak while one is on the train and the other is at home, etc.). The machine learning training cluster 102d may further update or train a machine learning model/algorithm corresponding to the communication between the first member and the second member based on (i) the received communication parameters and communication objectives of the first member, (ii) the received communication parameters and communication objectives of the second member, and (iii) the objective measurements of electronic communications between the first member and the second member (Step 308). For example, the machine learning model may incorporate and learn from the monitored and logged communication patterns, as well as the first and second members' indicated preferences. Further, the communication application system 102 may receive, at the at least one server, real-time data corresponding to the first member and/or the second member from at least one external data source (Step 310). For example, the communication application system may determine the real-time locations of the first and second members, the current time, the day of week, the scheduled activities, or any other contextual information relating to information stored in relation to the first and second members in the machine learning model. A score for communications availability between the first member and the second member may then be determined by comparing the received real-time data to the updated or trained model implemented by the machine learning training cluster 102d, of communication between the first member and the second member (Step 312). For example, the machine learning training cluster may determine that, since it is currently a Saturday and the first and second users historically like to speak to each other on the weekend, and since the first and second users have open calendars, that there is a 93% chance that now is a good ("favorable") time to recommend or even initiate communication between them, whereas if one member were away from home or had a calendared appointment, that score might drop to 72%. The execution cluster 102b may then generate and transmit an electronic notification to one or both of the first member and the second member if the determined score exceeds a threshold for favorable communications (314).

Figure 4:
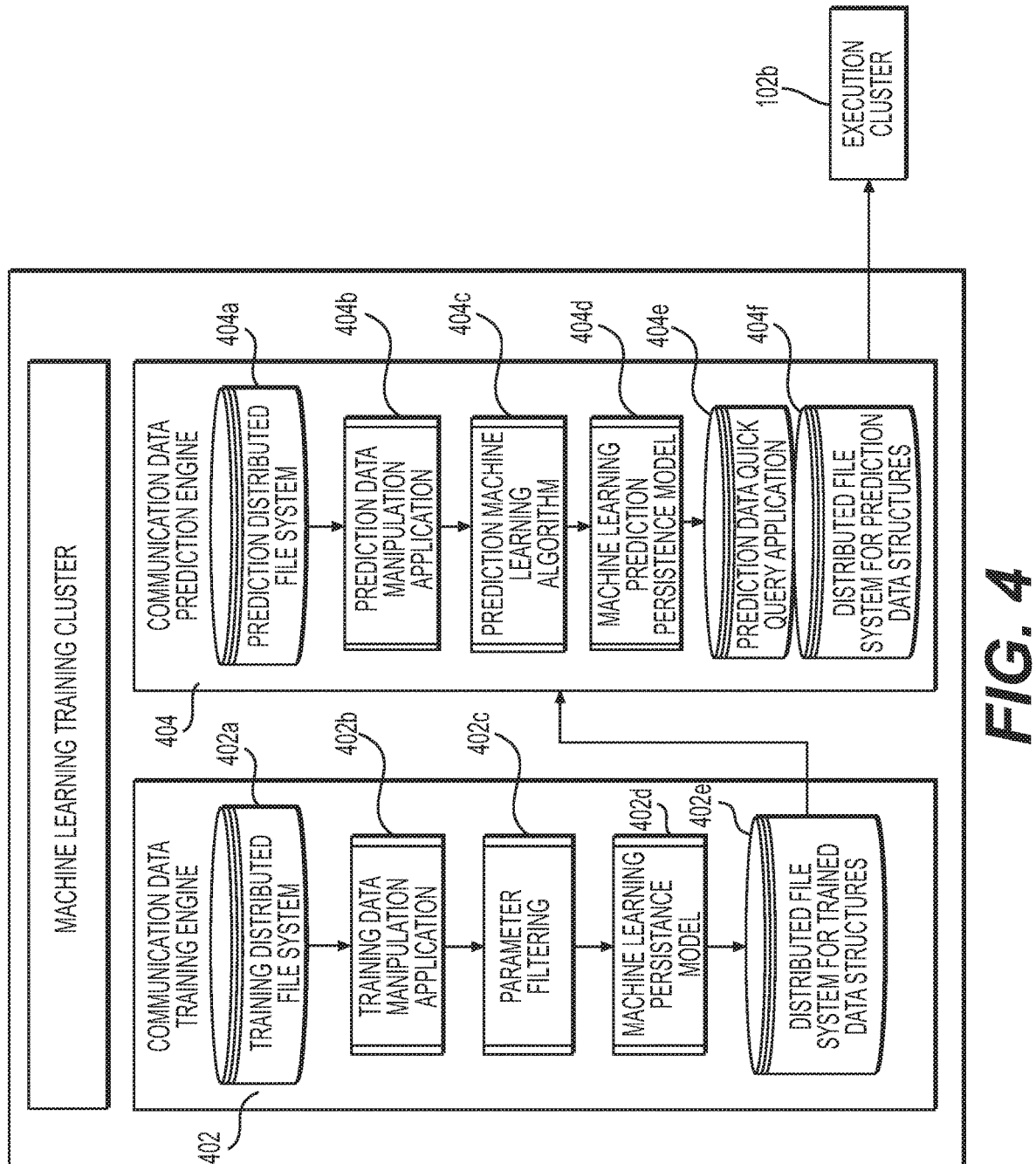
FIG. 4 depicts a block diagram of an exemplary architecture diagram of an exemplary machine learning system and machine learning algorithm for scheduling communication.

FIG. 4 depicts a block diagram of an exemplary architecture diagram of an exemplary machine learning system and machine learning algorithm for scheduling communication. As shown in FIG. 4, in general, machine learning system and environment 400 may comprise a communication data training engine 402 and a communication data prediction engine 404. Training data in the communication data training engine 402 may be trained daily over a time period (e.g. a predetermined time period), usually months, and initially stored in a training distributed file system 402a (e.g. one or more databases). A training data manipulation application 402b may call for the training data to be input from the training distributed file system 402a and further prepare the training data to be analyzed. Once the training data is in condition to be trained, it is obtained from the training data manipulation application 402b by a parameter filtering model 402c. Once the training data has been filtered, the machine learning persistence model 402d processes the training data with its model(s) to further fine tune both the data being analyzed and the machine algorithm itself. The machine learning persistence model 402d becomes the baseline algorithm for analyzing training data. During this transition from the initial training data manipulation application 402b to the machine learning persistence model 402d, previous training machine learning algorithms are stored for potential later use. The machine learning persistence model 402d and the training data that is output from the machine learning persistence model 402d are stored in the distributed file system for trained data structures 402e. The machine learning persistence model 402d and the training data that is output from the machine learning persistence model 402d are then input into the data communication data prediction engine 404, wherein the training data may be reclassified as prediction data.

Prediction data in the data prediction engine 404 is analyzed and predictions are made over a time period (e.g. a predetermined time period), usually days, and is initially stored in a prediction distributed file system 404a. A prediction data manipulation application 404b calls for the training data to be input from the prediction distributed file system (e.g. one or more databases) 404a and further prepares the prediction data to be analyzed. Once the prediction data is in condition to be analyzed, it is obtained by a prediction machine learning algorithm 404c from the prediction data manipulation application 404b. The prediction machine learning algorithm 404c processes the training data with its model(s) to further fine tune both the data being analyzed and the machine algorithm itself. The prediction machine learning algorithm 404c then inputs the training data into a machine learning prediction persistence model 404d, which is a model(s) that is chosen to be the baseline algorithm for analyzing training data. During this transition from the initial prediction machine learning algorithm 404c to the prediction persistence model, previous prediction machine learning algorithms are stored for potential later use. The machine learning prediction persistence model 404d and the training data that is output from the machine learning prediction persistence model 404d are processed by the prediction data quick query application 404e and stored in the distributed file system for prediction data structures 404f. The machine learning prediction persistence model 404d and the training data that is output from the machine learning prediction persistence model 404d are then transmitted to the execution cluster 102b for further analysis and manipulation. The machine learning system and environment 300 may implement:

Supervised learning
    Unsupervised learning
    Reinforcement learning
    Semi-supervised learning The machine learning system and environment 300 may implement one or more of the following algorithms, including but not limited to:

Regression:
    Ordinary Least Squares Regression (OLSR)
    Linear Regression
    Logistic Regression
    Stepwise Regression
    Multivariate Adaptive Regression Splines (MARS)
    Locally Estimated Scatterplot Smoothing (LOESS)
    Instance-based:
    k-Nearest Neighbor (kNN)
    Learning Vector Quantization (LVQ)
    Self-Organizing Map (SOM)
    Locally Weighted Learning (LWL)
    Regularization:
    Ridge Regression
    Least Absolute Shrinkage and Selection Operator (LASSO)
    Elastic Net
    Least-Angle Regression (LARS)
    Decision Tree:
    Random Forest
    Classification and Regression Tree (CART)
    Iterative Dichotomiser 3 (ID3)
    C4.5 and C5.0 (different versions of a powerful approach)
    Chi-squared Automatic Interaction Detection (CHAID)
    Decision Stump
    M5
    Conditional Decision Trees
    Bayesian:
    Naive Bayes
    Gaussian Naive Bayes
    Multinomial Naive Bayes
    Averaged One-Dependence Estimators (AODE)
    Bayesian Belief Network (BBN)
    Bayesian Network (BN)
    Clustering:
    k-Means
    k-Medians
    Expectation Maximization (EM)
    Hierarchical Clustering
    Association Rule Learning:
    Apriori algorithm
    Eclat algorithm
    Deep Learning Algorithms:
    Deep Boltzmann Machine (DBM)
    Deep Belief Networks (DBN)
    Convolutional Neural Network (CNN)
    Stacked Auto-Encoders
    Dimensionality Reduction Algorithms:
    Principal Component Analysis (PCA)
    Principal Component Regression (PCR)
    Partial Least Squares Regression (PLSR)
    Sammon Mapping
    Multidimensional Scaling (MDS)
    Projection Pursuit
    Linear Discriminant Analysis (LDA)
    Mixture Discriminant Analysis (MDA)
    Quadratic Discriminant Analysis (QDA)
    Flexible Discriminant Analysis (FDA)
    Ensemble:
    Boosting
    Bootstrapped Aggregation (Bagging)
    AdaBoost
    Stacked Generalization (blending)
    Gradient Boosting Machines (GBM)
    Gradient Boosted Regression Trees (GBRT)

In one embodiment, ranking accuracy may be measured by the following equation:

Ordered Area Under Curve $$OAUC = \frac{\sum a_{r_i}(r_i - i)}{\left\lfloor \frac{n}{2} \right\rfloor \sum_{i=1}^{\left\lfloor \frac{n}{2} \right\rfloor} \left(\left\lfloor \frac{n}{2} \right\rfloor + i\right)}$$

Figure 5:
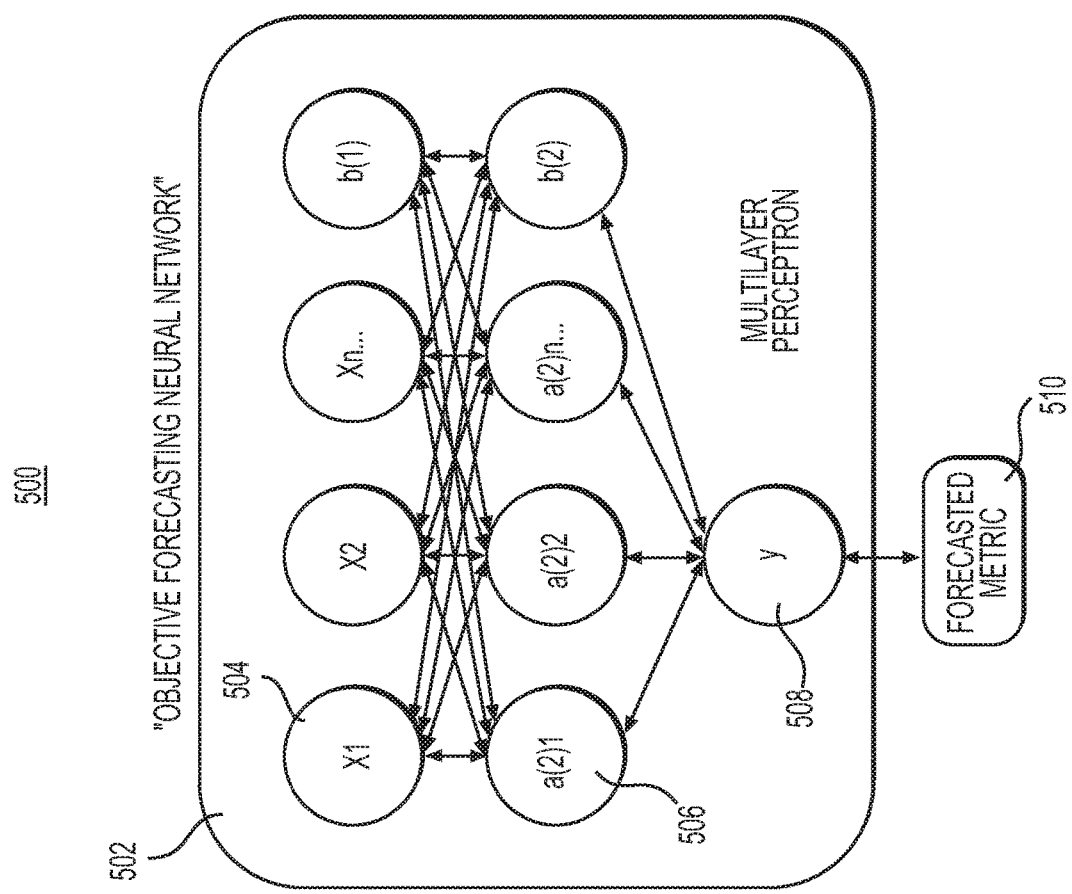
FIG. 5 depicts a block diagram of an exemplary method of a neural network forecasting learning strategy.

FIG. 5 depicts a block diagram of an exemplary method of a neural network forecasting learning strategy. The forecasting neural network 502 may be a multi-layer structure with one or more perceptrons at an input layer 504, one or more perceptrons at a hidden layer 506, and one or more perceptrons at an output layer 508. The input layer 504, hidden layer 506, and output layer 508 perceptrons may have multiple inputs capable of assigning a weight to incoming data. The weights may be adjusted as a result of a previous test. The neural network may output a forecast metric 510 after analyzing data via an algorithm/model (e.g. a regression model). The algorithm/model implemented by the neural network may be further defined and governed by various hyperparameters (e.g. neural network architecture, training parameters, and model parameters). The forecasting neural network 502 may be governed by the following algorithms:

Perceptron weight correction formulas $$\Delta w = \eta \times d \times x$$

where $\Delta w$, is the change in weight;
where d, is the predicted output or desired output;
where η, is the learning rate; and
where x, is the input data.
Root Mean Square Error Rate $$RMSE_{fo} = \left[\sum_{i=1}^{N}(z_{f_i} - z_{o_i})^2/N\right]^{1/2}$$

As an alternative to utilizing perceptrons, the neural network may implement one or more of the following algorithms:
Back-Propagation
Hopfield Network
Radial Basis Function Network (RBFN)

Figure 6:
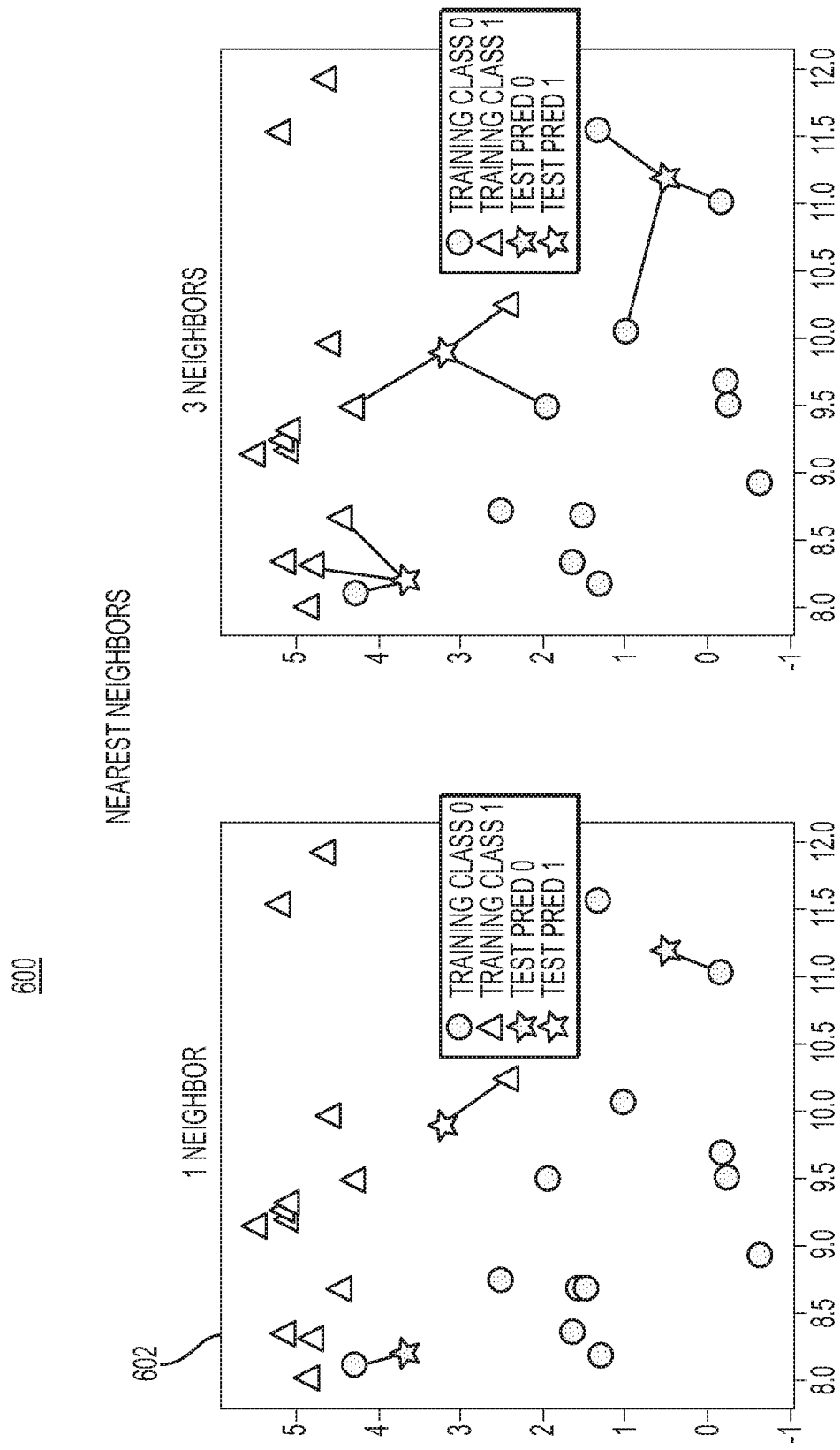
FIG. 6 depicts a graphical representation of an exemplary nearest neighbors machine learning method.

FIG. 6 depicts a graphical representation of an exemplary nearest neighbors machine learning method 602. K-Nearest Neighbors (KNN) is machine learning technique defined by a set of objects known as instances for which the outcome are known (i.e. the instances are labeled). Each instance consists of a data case having a set of independent values labeled by a set of dependent outcomes. Wherein a new case of dependent values (query point) is received an outcome based on KNN can be estimated. KNN achieves this by finding K examples that are closest in distance to the query point. The machine learning training cluster 102d may implement one or more nearest neighbors machine learning methods. For example, nearest neighbor techniques may be implemented for regression, wherein for regression problems, the prediction is based on the mean or the median of the K-most similar instances. In addition to regression, nearest neighbor techniques may be implemented for classification purposes, wherein the output can be calculated as the class with the highest frequency from the K-most similar instances. Training data may be rescaled (e.g. normalizing and standardizing training data to fall within a specific range) and missing data may be addressed, in order to optimize nearest neighbor techniques. A graphical representation of an exemplary nearest neighbors machine learning method 602 may be generated in order to further one or more processes disclosed herein.

Figure 7:
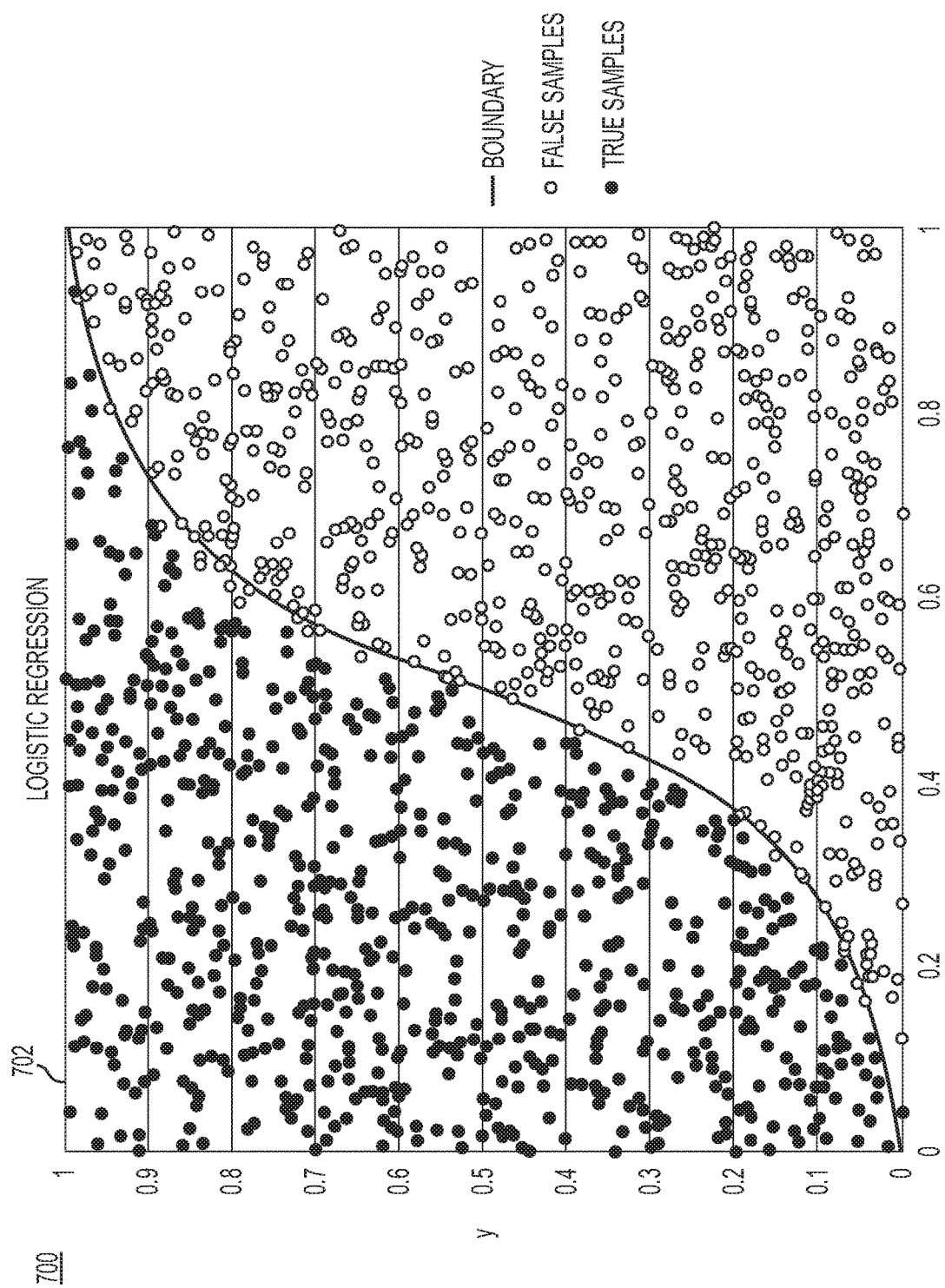
FIG. 7 depicts a graphical representation of a logistic regression machine learning method.

FIG. 7 depicts a graphical representation of a logistic regression machine learning method 702. Logistic regression analysis is a form of predictive modelling technique which analyzes the relationship between a dependent variable (i.e. target) and an independent variable (i.e. predictor). The machine learning training cluster 102d may implement one or more logistic regression machine learning methods. For example, binary logistic regression (e.g. investigating a scenario wherein the categorical response has only two possible outcomes), multinomial logistic regression (e.g. determining rank order or preferences for categories, wherein the preferred order is originally unknown), and ordinal logistic regression (e.g. determining the odds of a dependent variable being classified in at least one of three or more separate categories). A graphical representation of a logistic regression machine learning method 702 may be generated in order to further one or more processes disclosed herein.

Figure 8:
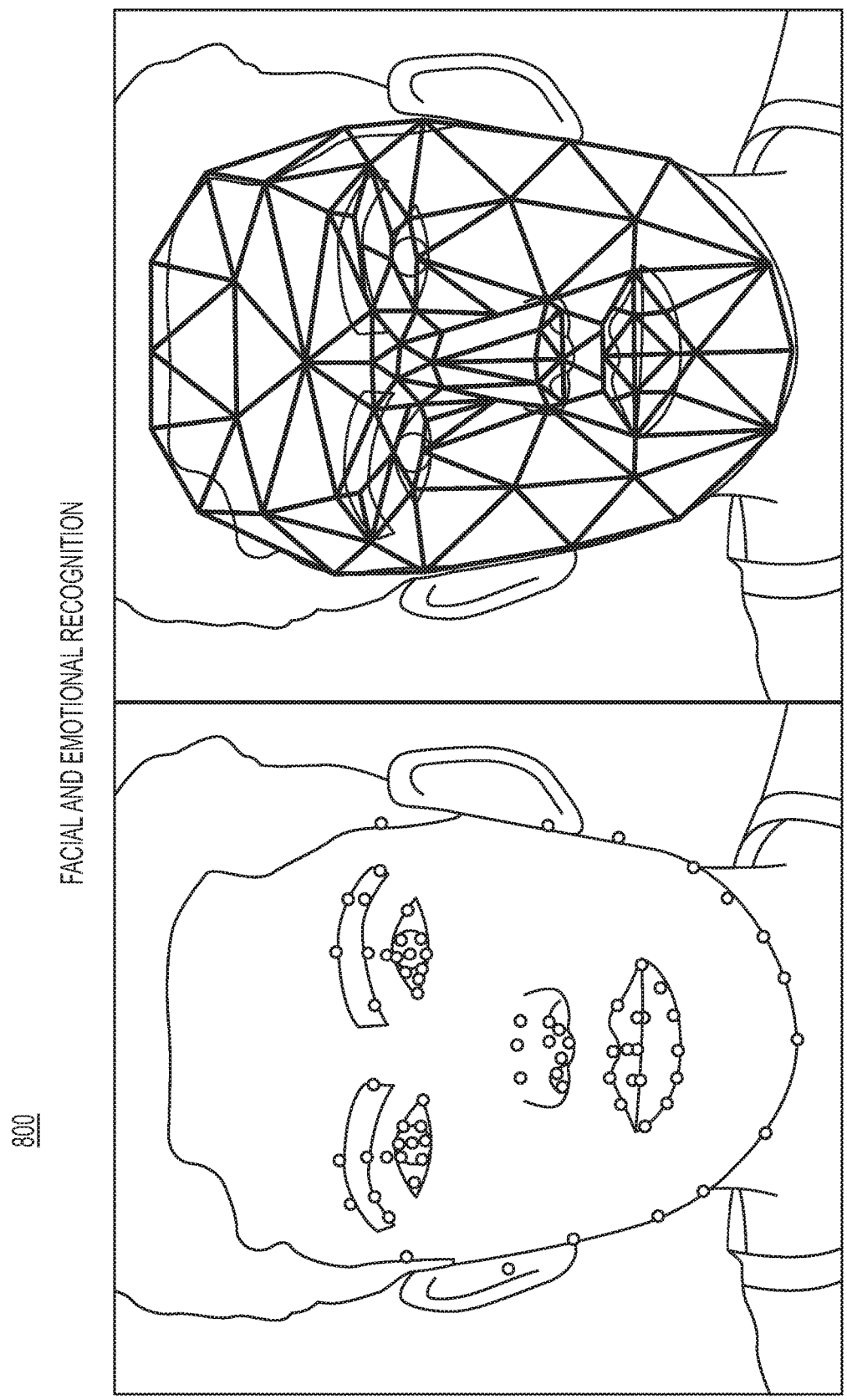
FIG. 8 depicts a graphical representation of facial and emotional recognition methods.

FIG. 8 depicts a graphical representation of facial and emotional recognition methods. The objective measurement server(s) 102c may be configured to analyze media objects, audio signal, and video signals, associated with user(s)/member(s)/user group(s) to detect the presence of user(s) or (s) having representations (e.g., images, voice, video etc.) captured therein. For example, objective measurement server(s) 102c may be configured to perform techniques of facial recognition, image recognition, and/or voice recognition to detect persons having representations captured in a media object stored on the data warehouse 102a, external data server(s) 104, or personal computing devices 108, and/or detect and analyze audio/video signals being shared, because of communication that is occurring in real-time between one or more user(s)/member(s)/user group(s). For example, objective measurement server(s) 102c may be configured to analyze image files (e.g., .GIF files, .JPG files, etc.) or configured to analyze a stream of data packets corresponding to video in one or more formats (e.g., MPEG files, Apple HLS, Adobe HDS, etc.).

For example, the objective measurement server(s) 102c may include an image recognition module (not shown) and a facial recognition module (not shown). Either or both of image recognition module and facial recognition module may be present in embodiments. Techniques of facial recognition that may be used by facial recognition module may include, but is not limited to, algorithms such as eigenface, fisherface, the Hidden Markov model, dynamic link matching, three-dimensional face recognition, skin texture analysis, etc.

As depicted in FIG. 8, the objective measurement server(s) 102c may user an image/video analyzer (not shown) to detect representations of persons in an image or a video. Facial recognition module may parse an image/video to locate one or more facial features, such as eyes, a nose, a mouth, hair, ears, etc., having a general facial arrangement to detect a face. For example, a region is shown in FIG. 8 surrounding a face of person, highlighting the specific facial features and facial contour. Facial recognition module may have detected such facial features as eyes and a mouth of person, to indicate a region as including a face corresponding to a user or member. In this manner, facial recognition module may detect one or more persons in an image or video.

Furthermore, image/video analyzer may detect representations of persons in an image by detecting one or more human body features. For example, image/video analyzer may parse an image/video to locate one or more human body features, such as a head, one or both arms, a torso, one or both legs, etc., that are interconnected in a general human body arrangement to detect a person. Although not shown, the image/video analyzer may have detected bodily features in FIG. 8, such as a head, arms, torso, and/or legs of a user or member, to indicate that a particular region has data points corresponding to a user or member. In this manner, image recognition the objective measurement server(s) 102c may detect one or more persons in image or video. Additionally, the image/video analyzer may detect a facial expression based on a shape of a mouth and/or lips, whether teeth are showing, whether a tongue is showing, a shape and/or direction of eyebrows, a shape and/or size of eyes, a shape and/or size of nostrils, an amount and location of wrinkles, etc. For instance, the image/video analyzer may identify a smiling facial expression based on detecting the lips are curved up and/or teeth are showing. Accordingly, the objective measurement server(s) may identify an emotion (e.g. happy, sad, angry, etc.). Techniques of image and video recognition may include but is not limited to computer vision techniques, pattern recognition techniques, etc.

Figure 9:
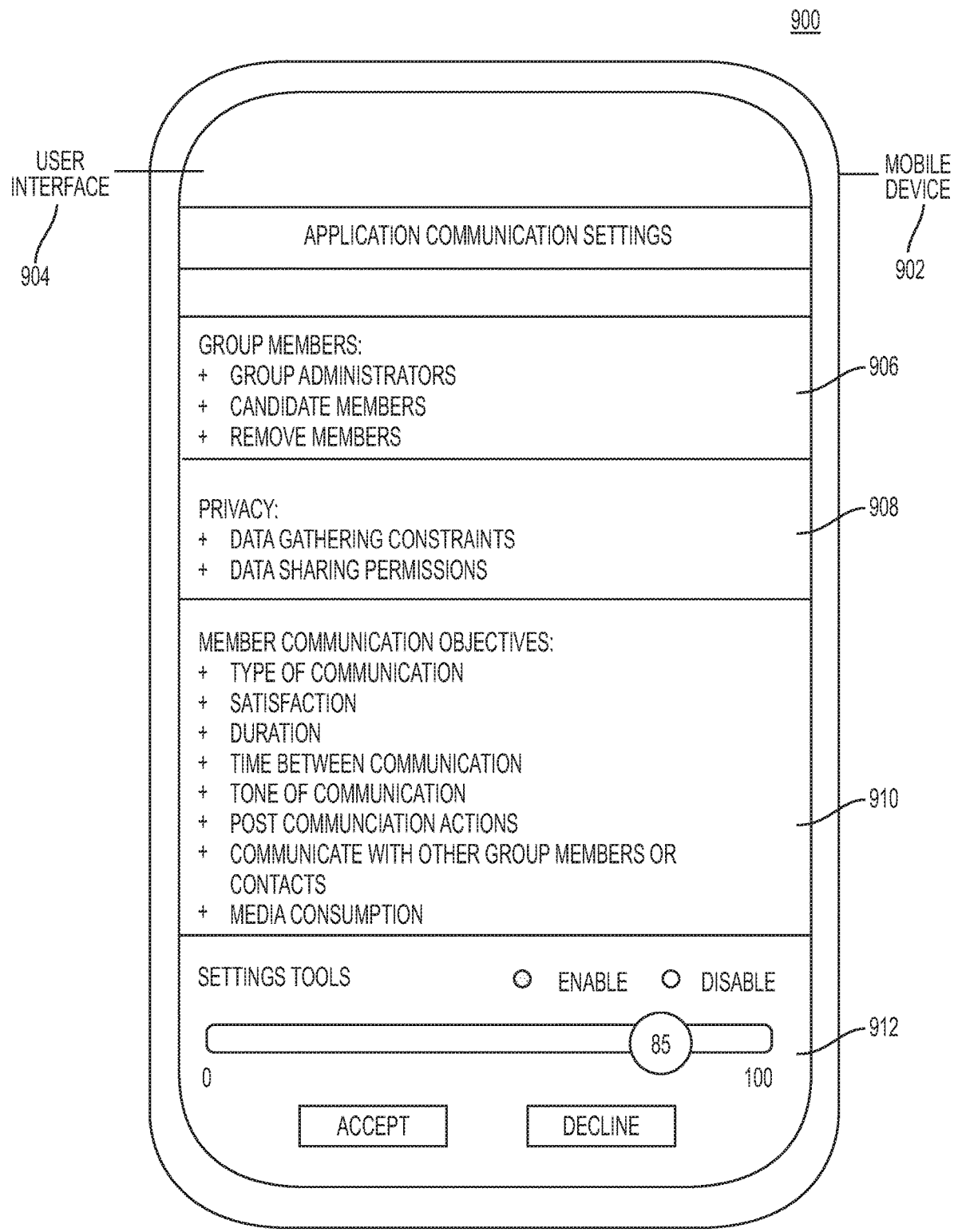
FIG. 9 depicts a graphical representation of a user interface for adjusting communication settings, parameters, and objectives on a personal computing device.

FIG. 9 depicts a graphical representation of a user interface for adjusting communication settings, parameters, and objectives on a personal computing device. Generally, a communication application will provide a user interface 904 on a personal computing device, for example a mobile device 902, so that a user(s)/member(s)/user group(s) can communicate their communication settings, parameters, and objectives to the communication application system 102. For example, via the user interface, user(s)/member(s)/user group(s) group members 906 settings are made available for at the very least establishing user group administrators, identifying candidate members, removing members, and opting in to a user group. The user interface 904 may additionally provide settings for user(s)/member(s)/user group(s) to privacy 908. For example, user(s)/member(s)/user group(s), may be able to adjust privacy settings including but not limited to data gathering constraints and data sharing permissions. The user interface 904 may further display and enable user(s)/member(s)/user group(s) to adjust member communication objectives 910. For example, enable user(s)/member(s)/user group(s) will have settings for: controlling the type of communication they receive (e.g. phone calls, video calls, text messages, etc.), reporting satisfaction with the various communication, adjusting the duration of communication, adjusting preferences for time between communication, adjusting preferences for the tone of communication, communicating post communication actions, preferences for communicating with other group members or contacts, and preferences regarding media consumption (e.g. movies, music, social media, and the like). The user interface 904 may further display settings tools 912 for enabling and disabling certain communication application features/settings, weighting and ranking preferences, and accepting and declining invitations, rules and agreements.

Figure 10:
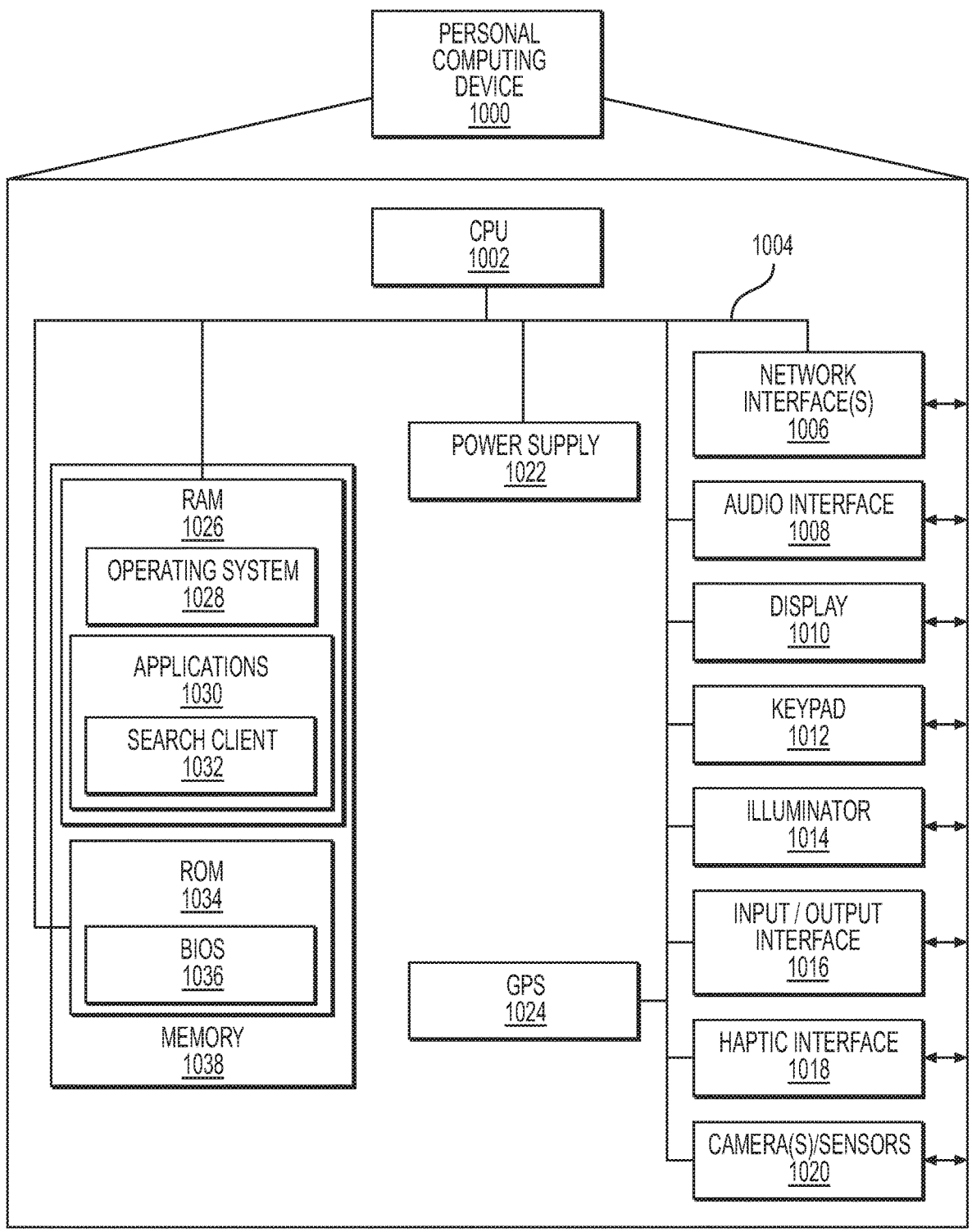
FIG. 10 a block diagram illustrating an example of a personal computing device in accordance with some embodiments of the present disclosure.

FIG. 10 a block diagram illustrating an example of a personal computing device in accordance with some embodiments of the present disclosure. Person computing device 1000 may include many more or less components than those shown in FIG. 10. However, the components shown are sufficient to disclose an illustrative embodiment for implementing the present disclosure. Personal computing device 1000 may represent, for example, personal computing devices discussed above in relation to FIG. 1A-B.

As shown in the figure, personal computing device 1000 includes a processing unit (CPU) 1002 in communication with a mass memory 1038 via a bus 1004. Personal computing device 1000 also includes a power supply 1022, one or more network interfaces 1006, an audio interface 1008, a display 1010, a keypad 1012, an illuminator 1014, an input/output interface 1016, a haptic interface 1018, an optional global positioning systems (GPS) receiver 1024 and a camera(s) or other optical, thermal or electromagnetic sensors 1020. Device 1000 can include one camera/sensor 1020, or a plurality of cameras/sensors 1020. The positioning of the camera(s)/sensor(s) 1020 on the personal computing device 1000 can change per personal computing device 1000 model, per personal computing device 1000 capabilities, and the like, or some combination thereof Power supply 1022 provides power to personal computing device 1000.

Personal computing device 1000 may optionally communicate with a base station (not shown), or directly with another computing device. Network interface 1006 is sometimes known as a transceiver, transceiving device, or network interface card (NIC).

Audio interface 1008 is arranged to produce and receive audio signals such as the sound of a human voice. For example, audio interface 1008 may be coupled to a speaker and microphone (not shown) to enable telecommunication with others and/or generate an audio acknowledgement for some action. Display 1010 may be a liquid crystal display (LCD), gas plasma, light emitting diode (LED), or any other type of display used with a computing device. Display 1010 may also include a touch sensitive screen arranged to receive input from an object such as a stylus or a digit from a human hand.

Keypad 1012 may comprise any input device arranged to receive input from a user Illuminator 1014 may provide a status indication and/or provide light.

Personal computing device 1000 also comprises input/output interface 1016 for communicating with external. Input/output interface 1016 can utilize one or more communication technologies, such as USB, infrared, Bluetooth™, or the like. Haptic interface 1018 is arranged to provide tactile feedback to a user of the personal computing device.

Optional GPS receiver 1024 can determine the physical coordinates of personal computing device 1000 on the surface of the Earth, which typically outputs a location as latitude and longitude values. GPS receiver 1024 can also employ other geo-positioning mechanisms, including, but not limited to, triangulation, assisted GPS (AGPS), E-OTD, CI, SAI, ETA, BSS or the like, to further determine the physical location of personal computing device 1000 on the surface of the Earth. In one embodiment, however, personal computing device may through other components, provide other information that may be employed to determine a physical location of the device, including for example, a MAC address, Internet Protocol (IP) address, or the like.

Mass memory 1038 includes a RAM 1026, a ROM 1034, and other storage means. Mass memory 1038 illustrates another example of computer storage media for storage of information such as computer readable instructions, data structures, program modules or other data. Mass memory 1038 stores a basic input/output system ("BIOS") 1036 for controlling low-level operation of personal computing device 1000. The mass memory also stores an operating system 1028 for controlling the operation of personal computing device 1000.

Memory 1038 further includes one or more data stores, which can be utilized by personal computing device 1000 to store, among other things, applications 1030 and/or other information or data. For example, data stores may be employed to store information that describes various capabilities of personal computing device 1000. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within personal computing device 1000.

Applications 1030 may include computer executable instructions which, when executed by personal computing device 1000, transmit, receive, and/or otherwise process audio, video, images, and enable telecommunication with a server and/or another user of another personal computing device. Applications 1030 may further include search client 1032 that is configured to send, to receive, and/or to otherwise process a search query and/or search result.

In some implementations a communication can be scheduled for two or more user(s)/member(s)/user group(s) automatically, based on one or more embodiments or features disclosed above. Additionally, or alternatively, a notification recommending communication between two or more user(s)/member(s)/user group(s) be transmitted to personal computing devices of the user(s)/member(s)/user group(s) for which a communication has been scheduled. Moreover, a communication may be automatically initiated between two or more user(s)/member(s)/user group(s) based on user(s)/member(s)/user group(s) on the combination of one or more previously disclosed features. For example, if the communication application system 102 determines that a first member of a user group is sad based on data received from a recent video call associated with the first member, a second member belonging to the user group may receive a notification to contact the first member on a specific date and time. Alternatively, for example, if the communication application system 102, determines that first member is sad and that both the first member and second member are currently available, the communication application system 102 may initiate a communication between the members in real-time. As another example, a first member may be a college student with a bank account that has a low balance, the communication application system 102 may receive banking information from an external data server(s) 104 and based on machine learning models determine that a second member, a parent of the first member, should communicate with the first member with a certain time window, and further transmit an alert to the personal computing devices of either one or both of the first member or second member recommending the communication. The communication application system 102 may further recommend communication between two or more user(s)/member(s)/user group(s) based on the user(s)/member(s)/user group(s) being in close proximity to one another (e.g. with a predetermined geographical boundary).

One having ordinary skill in the art will recognize that the aforementioned examples and embodiments are not meant to be limiting and can be implemented in combination with any disclosed features or other examples and embodiments. Furthermore, while the terms user, member, and user group are defined, one having ordinary skill in the art that like terms, for example, first user, second user, third user, and so on, when used, are meant to precisely identify one or more individuals categorized as either a user, member, or user group.

What is claimed is:

1. A computer-implemented method for initiating electronic communication sessions between users of a communication group, including group comprising:
   receiving, at a server processor, a first set of input data from a first user device of a first user, the first set of input data including first communication parameters and first communication objectives of the first user;
   receiving, at the server processor, a second set of input data from a second user device of a second user, the second set of input data including second communication parameters and second communication objectives of the second user, wherein the first user and the second user are opt-in members of a communication group;
   receiving, at the server processor, first objective measurements of one or more electronic communication sessions between the first user and the second user, wherein the first objective measurements include time-between-communication information and tone-of-communication information, the tone-of-communication information including at least one of a tone signal indicating user vocal pitch and an image signal based on user facial recognition;
   updating, by the server processor, a machine learning model based on the one or more electronic communication sessions between the first user and the second user, wherein updating the machine learning model includes (i) the first communication parameters and the first communication objectives of the first user, (ii) the second communication parameters and the second communication objectives of the second user, and (iii) the first objective measurements of the one or more electronic communication sessions between the first user and the second user;
   receiving, at the server processor, real-time data from an external server, the real-time data corresponding to at least one of the first user and the second user;
   determining, by the server processor, a communication availability score for the one or more electronic communication sessions between the first user and the second user, the communication availability score based on a comparison between the real-time data received from the external server and the updated machine learning model;
   based on the communication availability score exceeding a predetermined threshold, transmitting, by the server processor, an electronic notification to one or both of the first user device of the first user and the second user device of the second user, the electronic notification including instructions for scheduling a second electronic communication session between the first user and the second user; and
   monitoring post-communication actions of the first user and the second user in order to schedule one or more subsequent electronic communication sessions.

2. The computer-implemented method of claim 1, wherein the first communication parameters and the second communication parameters further include one or more of:
   user options for opting out of the communication group;
   user options for modifying data-gathering constraints corresponding to inputs in an electronic communication application; and
   user options for removing one or more users from the communication group.

3. The computer-implemented method of claim 1, wherein the first communication objectives and the second communication objectives further include one or more of:
   user options for selecting a preferred communication medium;
   user options for providing user satisfaction with the one or more electronic communication sessions;
   user options for setting a duration for the one or more electronic communication sessions; and
   user options for requesting an electronic communication session with a first tone signal.

4. The computer-implemented method of claim 3, wherein the electronic notification further includes availability information of one of the first user and the second user; and wherein one or more of the first communication objectives matches at least matches one or more of the second communication objectives.

5. The computer-implemented method of claim 1, wherein updating the machine learning model is further based on an update to one or more of the first communication parameters, the first communication objectives, the second communication parameters, and the second communication objectives.

6. The computer-implemented method of claim 1, wherein updating the machine learning model is further based on an update to one or more of the electronic notifications transmitted to one or more members of the communication group.

7. The computer-implemented method of claim 1, wherein updating the machine learning model is further based on monitoring post-communication actions of the first user and the second user, wherein the post-communication actions include one or more of: user purchasing habits, user device location data, media consumption, user inputs on third party applications, and user device settings.

8. A system for initiating electronic communication between users of a communication group, comprising:
 receiving, at a server processor, a first set of input data from a first user device of a first user, the first set of input data including first communication parameters and first communication objectives of the first user;
 receiving, at the server processor, a second set of input data from a second user device of a second user, the second set of input data including second communication parameters and second communication objectives of the second user, wherein the first user and the second user are opt-in members of a communication group;
 receiving, at the server processor, first objective measurements of one or more electronic communication sessions between the first user and the second user, wherein the first objective measurements include time-between-communication information and tone-of-communication information, the tone-of-communication information including at least one of a tone signal indicating user vocal pitch and an image signal based on user facial recognition;
 updating, by the server processor, a machine learning model based on the one or more electronic communication sessions between the first user and the second user, wherein updating the machine learning model includes (i) the first communication parameters and the first communication objectives of the first user, (ii) the second communication parameters and the second communication objectives of the second user, and (iii) the first objective measurements of the one or more electronic communication sessions between the first user and the second user;
 receiving, at the server processor, real-time data from an external server, the real-time data corresponding to at least one of the first user and the second user;
 determining, by the server processor, a communication availability score for the one or more electronic communication sessions between the first user and the second user, the communication availability score based on a comparison between the real-time data received from the external server and the updated machine learning model;
 based on the communication availability score exceeding a predetermined threshold, transmitting, by the server processor, an electronic notification to one or both of the first user device of the first user and the second user device of the second user, the electronic notification including instructions for scheduling a second electronic communication session between the first user and the second user; and
 monitoring post-communication actions of the first user and the second user in order to schedule one or more subsequent electronic communication sessions.

9. The system of claim 8, wherein the first communication parameters and the second communication parameters further include one or more of:
 user options for opting out of the communication group;
 user options for modifying data-gathering constraints corresponding to inputs in an electronic communication application; and
 user options for and removing one or more users from the communication group.

10. The system of claim 8, wherein the first communication objectives and the second communication objectives further include one or more of:
 user options for selecting a preferred communication medium;
 user options for providing user satisfaction with the one or more electronic communication sessions;
 user options for setting a duration for the one or more electronic communication sessions; and
 user options for requesting an electronic communication session with a first tone signal.

11. The system of claim 10, wherein the electronic notification further includes availability information of one of the first user and the second user; and wherein one or more of the first communication objectives matches one or more of the second communication objectives.

12. The system of claim 8, wherein updating the machine learning model is further based on an update to one or more of the first communication parameters, the first communication objectives, the second communication parameters, and the second communication objectives.

13. The system of claim 8, wherein updating the machine learning model is further based on an update to one or more of the electronic notifications transmitted to one or more members of the communication group.

14. The system of claim 8, wherein updating the machine learning model is further based on monitoring post-communication actions of the first user and the second user, wherein the post-communication actions include one or more of: user purchasing habits, user device location data, media consumption, user inputs on third party applications, and user device settings.

15. A non-transitory computer readable medium for initiating electronic communication sessions between users of a communication group, comprising:
 receiving, at a server processor, a first set of input data from a first user device of a first user, the first set of input data including first communication parameters and first communication objectives of the first user;
 receiving, at the server processor, a second set of input data from a second user device of a second user, the second set of input data including second communication parameters and second communication objectives of the second user, wherein the first user and the second user are opt-in members of a communication group;
 receiving, at the server processor, first objective measurements of one or more electronic communication sessions between the first user and the second user, wherein the first objective measurements include time-between-communication information and tone-of-communication information, the tone-of-communication information including at least one of a tone signal indicating user vocal pitch and an image signal based on user facial recognition;
 updating, by the server processor, a machine learning model based on the one or more electronic communication sessions between the first user and the second user, wherein updating the machine learning model includes (i) the first communication parameters and the first communication objectives of the first user, (ii) the second communication parameters and the second communication objectives of the second user, and (iii) the first objective measurements of the one or more electronic communication sessions between the first user and the second user;

receiving, at the server processor, real-time data from an external server, the real-time data corresponding to at least one of the first user and the second user;

determining, by the server processor, a communication availability score for the one or more electronic communication sessions between the first user and the second user, the communication availability score based on a comparison between the real-time data received from the external server and the updated machine learning model;

based on the communication availability score exceeding a predetermined threshold, transmitting, by the server processor, an electronic notification to one or both of the first user device of the first user and the second user device of the second user, the electronic notification including instructions for scheduling a second electronic communication session between the first user and the second user; and monitoring post-communication actions of the first user and the second user in order to schedule one or more subsequent electronic communication sessions.

16. The non-transitory computer-readable medium of claim 15, wherein the first communication parameters and the second communication parameters further of include one or more of:

user options for opting out of the communication group;

user options for modifying data-gathering constraints corresponding to inputs in an electronic communication application; and user options for removing one or more users from the communication group.

17. The non-transitory computer-readable medium of claim 15, wherein the first communication objectives and the second communication objectives further include one or more of:

user options for selecting a preferred communication medium;

user options for providing user satisfaction with the one or more electronic communication sessions;

user options for setting a duration for the one or more electronic communication sessions; and user options for requesting an electronic communication session with a first tone signal.

18. The non-transitory computer-readable medium of claim 17, wherein the electronic notification further includes availability information of one of the first user and the second user; and wherein one or more of the first communication objectives matches one or more of the second communication objectives.

19. The non-transitory computer-readable medium of claim 15, wherein updating the machine learning model is further based on an update to one or more of the first communication parameters, the first communication objectives, the second communication parameters, and the second communication objectives.

20. The non-transitory computer-readable medium of claim 15, wherein updating the machine learning model is further based on an update to one or more of the electronic notifications transmitted to one or more members of the communication group.

* * * * *

UNITED STATES PATENT AND TRADEMARK OFFICE
CERTIFICATE OF CORRECTION

PATENT NO. : 11,140,102 B1  
APPLICATION NO. : 16/370505  
DATED : October 5, 2021  
INVENTOR(S) : Eric Bax et al.

It is certified that error appears in the above-identified patent and that said Letters Patent is hereby corrected as shown below:

In the Claims

Column 19 Line 3 of Claim 1, delete "group comprising:" and insert --:--.

Column 20 Line 6 of Claim 4, delete "matches at least matches" and insert --matches--.

Column 23 Line 3 of Claim 16, delete "further of" and insert --further--.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*